(12) United States Patent
Mandavilli et al.

(10) Patent No.: US 7,643,434 B2
(45) Date of Patent: Jan. 5, 2010

(54) METHOD AND SYSTEM FOR MANAGING NETWORK NODES WHICH COMMUNICATE VIA CONNECTIVITY SERVICES OF A SERVICE PROVIDER

(75) Inventors: Swamy J. Mandavilli, Fort Collins, CO (US); Damian Horner, Belfast (IE); Anil A. Kuriakose, Kottayam (IN); Sunil Menon, Cupertino, CA (US); Richard David Lamb, Fort Collins, CO (US); Andrew Walding, Plano, TX (US); Joseph M. Odenwald, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/953,281

(22) Filed: Sep. 30, 2004

(65) Prior Publication Data
US 2006/0072589 A1    Apr. 6, 2006

(51) Int. Cl.
*H04L 12/28* (2006.01)
*H04L 12/54* (2006.01)
*G06F 15/16* (2006.01)
*G06F 15/173* (2006.01)

(52) U.S. Cl. .................. 370/254; 370/395.53; 370/409; 709/203; 709/223

(58) Field of Classification Search ................. 370/254, 370/395.53, 409; 709/203, 223
See application file for complete search history.

(56) References Cited

U.S. PATENT DOCUMENTS

| | | | |
|---|---|---|---|
| 6,693,878 B1 * | 2/2004 | Daruwalla et al. | 370/235 |
| 7,035,259 B2 * | 4/2006 | Nomura et al. | 370/392 |
| 7,075,933 B2 * | 7/2006 | Aysan | 370/395.31 |
| 7,272,643 B1 * | 9/2007 | Sarkar et al. | 709/222 |
| 7,327,675 B1 * | 2/2008 | Goode | 370/230 |
| 7,409,712 B1 * | 8/2008 | Brooks et al. | 726/22 |
| 7,450,505 B2 * | 11/2008 | Buchanan et al. | 370/231 |
| 7,486,659 B1 * | 2/2009 | Unbehagen et al. | 370/351 |
| 7,568,047 B1 * | 7/2009 | Aysan et al. | 709/238 |
| 7,571,463 B1 * | 8/2009 | Fedyk et al. | 726/3 |
| 2002/0167914 A1 * | 11/2002 | Haneda | 370/255 |
| 2003/0005102 A1 * | 1/2003 | Russell | 709/223 |
| 2003/0133464 A1 * | 7/2003 | Marejka et al. | 370/411 |
| 2003/0219022 A1 * | 11/2003 | Dillon et al. | 370/395.52 |
| 2004/0034695 A1 * | 2/2004 | Touch et al. | 709/209 |
| 2004/0078105 A1 * | 4/2004 | Moon et al. | 700/100 |

(Continued)

FOREIGN PATENT DOCUMENTS

CA      2474879      1/2003

(Continued)

OTHER PUBLICATIONS

Dong-Jin Shin et al: "Design and Implementation of Configuration Management for the MPLS Network", KNOM Review 'Online! vol. 5, No. 1, Dec. 2002, XP002359281.

(Continued)

*Primary Examiner*—Alpus H Hsu

(57) ABSTRACT

A method is disclosed for managing network nodes, such as the nodes of a network, which communicate via connectivity services of a service provider. An exemplary method includes discovering status and configuration information for each set of nodes grouped by the service provider; and assigning a name to each set of nodes.

25 Claims, 4 Drawing Sheets

U.S. PATENT DOCUMENTS

| | | | |
|---|---|---|---|
| 2004/0223498 A1* | 11/2004 | Sanderson et al. | 370/395.52 |
| 2005/0083955 A1* | 4/2005 | Guichard et al. | 370/409 |
| 2005/0091482 A1* | 4/2005 | Gray et al. | 713/151 |
| 2005/0108379 A1* | 5/2005 | Gray et al. | 709/223 |
| 2005/0129001 A1* | 6/2005 | Backman et al. | 370/352 |
| 2005/0138204 A1* | 6/2005 | Iyer et al. | 709/242 |
| 2005/0190757 A1* | 9/2005 | Sajassi | 370/389 |
| 2006/0013209 A1* | 1/2006 | Somasundaram | 370/389 |
| 2006/0034297 A1* | 2/2006 | O'Neill | 370/395.53 |
| 2006/0050653 A1* | 3/2006 | Guichard et al. | 370/254 |
| 2006/0056314 A1* | 3/2006 | Daures | 370/254 |
| 2006/0251114 A1* | 11/2006 | Nuggehalli et al. | 370/466 |

FOREIGN PATENT DOCUMENTS

| | | |
|---|---|---|
| EP | 1517482 | 3/2005 |

OTHER PUBLICATIONS

Carugi Nortel Networks D Mcdysan MCI (Co-Editors) M: Service requirements for Layer 3 Provider Provisioned Virtual Private Networks: IETF Standard-Working-Draft, Internet E, Apr. 2003.

Paul Knight (Editor) Hamid Ould-Brahim Nortel Networks Bryan Gleeson Nokia: "Network based IP VPN Architecture using Virtual Routers" IETF Standard Working Draft, IETF, CH, Apr. 2004.

Thomas D Nadeau Cisco Systems et al: "MPLS/BGP Layer 3 Virtual Private Network Management Information Base" IETF Standard-Working-Draft, Internet Engineering Task Force, IET, Aug. 2004.

\* cited by examiner

METHOD AND SYSTEM FOR MANAGING NETWORK NODES WHICH COMMUNICATE VIA CONNECTIVITY SERVICES OF A SERVICE PROVIDER

BACKGROUND

A method and system are disclosed for managing nodes of a computer network which communicate via connectivity services of a service provider, such as virtual private network (VPN) services.

For example, a customer may have a network with nodes in multiple geographical locations, and a service provider can be used to connect these different locations. Because the service provider can provide connectivity services to multiple customers, multiple VPNs can be configured by the service provider.

MultiProtocol Label Switching (MPLS) is an IETF initiative directed to enhancing Internet Protocol (IP) packet exchange by combining network link information such as bandwidth, latency and utilization, into layer L3 (IP) information. The inclusion of layer L2 network link information into layer L3 information can provide network administrators enhanced flexibility in managing network traffic.

When a data packet enters an MPLS network, Label Edge Routers (LERs) provide the packets with a label, or identifier. The packets are classified, and assigned to corresponding Label Switch Paths (LSPs).

In the case of connectivity services provided by third party service providers, the service providers may provide only limited management capabilities. For example, VPN service providers provide limited VPN management capabilities for use in managing an MPLS VPN network.

SUMMARY

A method is disclosed for managing network nodes which communicate via connectivity services of a service provider. An exemplary method includes discovering status and configuration information for each set of nodes grouped by the service provider; and assigning a name to each set of nodes.

An exemplary system is also disclosed for managing network nodes which communicate via connectivity services of a service provider, comprising: a processor for discovering status and configuration information for each set of nodes grouped by the service provider, and for assigning a name to each set of nodes. A memory is provided for storing the status and configuration information for use by the processor.

BRIEF DESCRIPTION OF THE DRAWINGS

Exemplary embodiments, along with attendant features and advantages, will be described in the context of exemplary embodiments as shown in the Figures, wherein.

DETAILED DESCRIPTION

Figure 1:
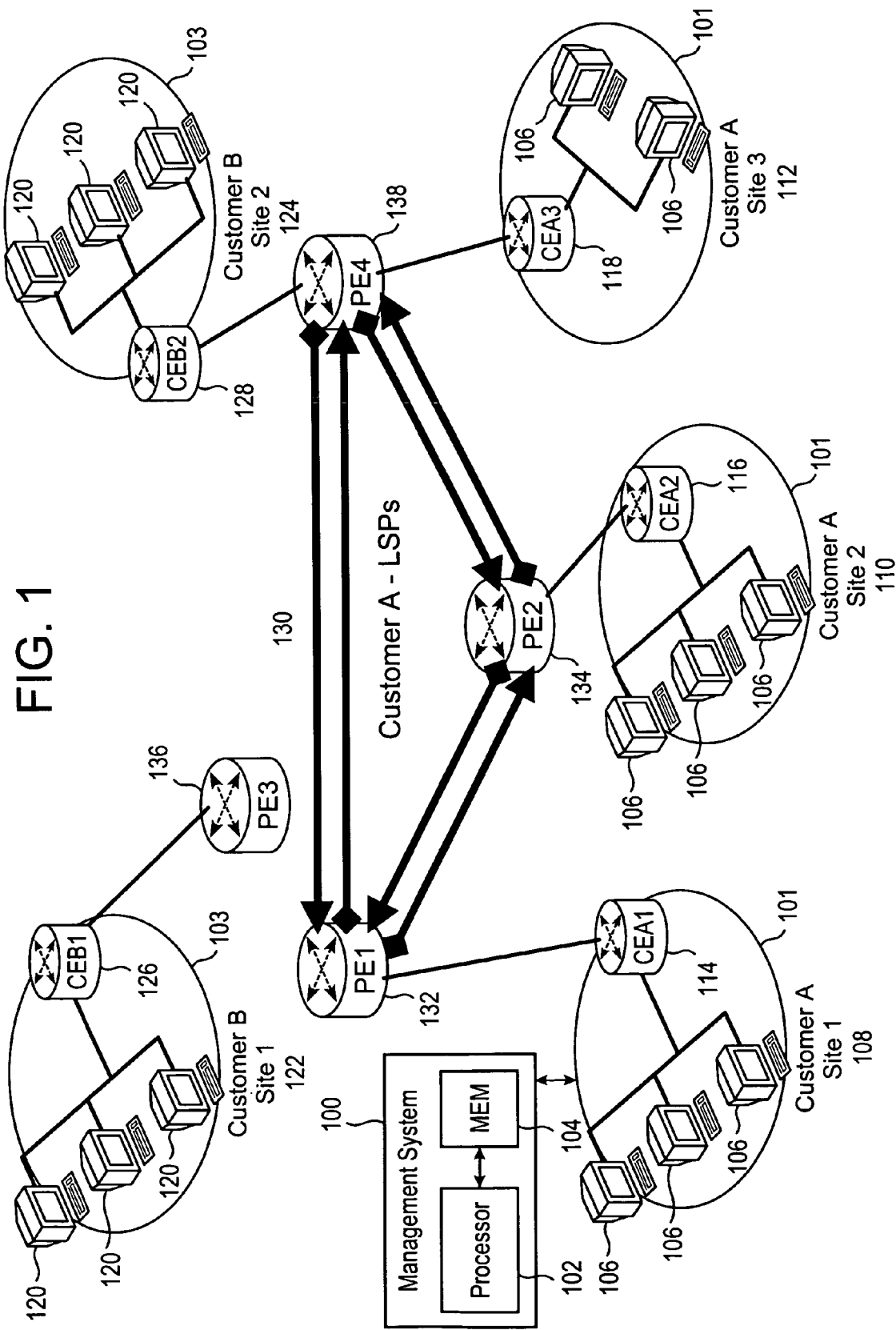
FIG. 1 illustrates an exemplary network which communicates via connectivity services of a service provider.

FIG. 1 shows an exemplary system for managing network nodes which communicate via connectivity services of a service provider. The exemplary system 100 includes a processor 102 and an associated memory 104.

A means, such as the processor 102, is provided for discovering status and configuration information for each set of nodes grouped by a service provider, and for assigning a name to each set of nodes. A means, such as the memory 104, is provided for storing the status and configuration information discovered.

The system 100, as shown in FIG. 1, is associated with a network 101 of "Customer A." Customer A's network includes nodes 106 located among multiple sites 108, 110 and 112, labeled site 1, site 2 and site 3, respectively. The various sites can be physically (e.g., geographically) separated from one another. For example, an enterprise network will typically include nodes at an office location in a first geographical location, which are to interface with nodes associated with an office complex located in a second geographical location, that can be situated miles away from the first location. Each of the sites can include any number of nodes and routers. A customer edge router 114, 116 and 118 is shown for each of the respective sites 108, 110 and 112.

To assist in understanding features described herein, FIG. 1 illustrates a second network 103 of a Customer B, having nodes 120 located at each of multiple sites 122 and 124, labeled site 1 and site 2, respectively. Each site 122, 124 in the Customer B network is also shown to include a customer edge router 126, 128, respectively.

The nodes of Customer A's network communicate via use of a service provider network 130. Similarly, the nodes of customer B's network communicate via the same service provider network 130. The service provider provides connectivity services, such as VPN services, to customer networks. In an exemplary embodiment, the networks being managed are MPLS VPN networks, and each group of nodes is a VPN configured by the service provider. The service provider network includes edge routers 132, 134, 136 and 138.

An administrator managing the MPLS VPN network of Customer A can, according to the exemplary embodiments described herein, be provided with status information for all VPNs configured in the environment. In addition, configuration information can be provided to indicate the location at which each VPN is deployed, and information regarding which edge routers are associated with each VPN. Exemplary embodiments use information regarding which router interface belongs to which VPN Routing and Forwarding (VRF) table to ascertain the status and configuration information.

Exemplary embodiments provide an ability to view an inventory of all VPNs in the environment, and an ability to easily determine if an existing configuration matches an intended configuration. With regard to configuration matching, details regarding VPN, VRF, VRF-VRF neighbor, VRF-interface relationships, and so forth can be provided.

The system for managing the network can use discovered data to perform an impact analysis based on infrastructure failures. The administrator can prioritize repair tasks based on an importance of a particular VPN (e.g., service level agreement (SLA) violations and so forth). Exemplary embodiments allow an administrator to diagnose and repair failures, thereby reducing MTTR.

An exemplary method for managing network nodes which communicate via connectivity services of a service provider can be stored on a computer readable medium as a program which configures a computer processor, such as the processor 102. An exemplary method will be described with respect to a VPN file which can, for example, be stored in an XML file or a database, using information obtained during VPN discovery.

The information can be obtained from Management Information Bases (MIBs), such as those stored at routers and described with respect to CISCO IOS Software Release 12.OS, available from CISCO Systems.

The VPN discovery and storage of information discovered in a VPN information file will now be described. The VPN information to be discovered can include, for each VPN, details regarding provider edge (PE) routers, interfaces, VRF/VPN details and Interface-VPN relationships. In an exemplary XML file, an internal ID and VPN name is maintained for each MPLS VPN identified in the network. An exemplary XML File for an MPLS VPN having an internal ID of "1" and a VPN name "HP", referred to herein as VPN_INFO file, that can be created for use with HP's Network Node Manager™ (NNM) product, available from HP, is as follows:

```
<MPLS_VPN_INFO>
    <MPLS_VPN>
        <VPN_INTERNAL_ID>1</VPN_INTERNAL_ID>
        <VPN_NAME>HP</VPN_NAME>
        <PE_Router>
            <!-- Selection Name in NNM -->
            <Hostname>Service Provider_PE1</Hostname>
            <SNMP_Addr>15.2.32.81</SNMP_Addr>
            <VRF>
                <VRF_Name>HP</VRF_Name>
                <VRF_Description>HP Site in
                Boeblingen</VRF_Description>
                <Route_Distinguisher>100:12</Route_Distinguisher>
                <Interfaces>
                    <Interface>
                        <IF_Index>3</IF_Index>
                        <IF_Desc>serial0/0<IF_Desc>
                        <NNM_ObjID>346</NNM_ObjID>
                    </Interface>
                    <Interface>
                        ...
                    </Interface>
                </Interfaces>
                <Export_RT_List>
                    <Export_RT>100:12</Export_RT>
                    ...
                </Export_RT_List>
                <Import_RT_List>
                    <Import_RT>100:12</Import_RT>
                    ...
                </Import_RT_List>
                <VRF-Neighbors>
                    <VRF-Neighbor>
                        <RemotePE>Service
                        Provider_PE2</RemotePE>
                        <RemoteVRF>HP</RemoteVRF>
                    </VRF-Neighbor>
                    ...
                </VRF-Neighbors>
            </VRF>
            <VRF>
                ...
            </VRF>
        </PE_Router>
        <PE_Router>
            ...
        </PE_Router>
    </MPLS_VPN>
    <MPLS_VPN>...</MPLS_VPN>
</MPLS_VPN_INFO>
```

In the foregoing XML file, for the VPN "HP", each provider edge (PE) router is identified. For each provider edge router, the host name, SNMP address and all associated VRF tables are provided.

In the foregoing example, an exemplary first provider edge router is associated with the host "service provider_PE1" (i.e., provider edge router 132 of FIG. 1), having an SNMP address of "15.2.32.81" and having multiple VRF tables. A first of the VRF tables is VRF "HP" described as an HP site in Boeblingen, Germany with a route distinguisher of "100:12".

Note that for each VRF identifier, the interfaces associated with the VRF are provided. In the foregoing example, the VRF "HP" includes a first interface designated by an interface index of "3", an interface description as a "serial 0" interface and as having an object ID of "346". Those skilled in the art will appreciate that numerous interfaces can be associated with the VRF, and that numerous VRF's can be associated with the provider edge router in the foregoing example.

Each VRF in the foregoing example, is also associated with export and import route target lists. Note that in the foregoing VFR example, an export route target list designates a routing target "100:12" and an import routing target list also designates routing target "100:12". In other words, the VFR associated with the provider edge included in the database routes packets to, and receives packets from route targets which communicate over a route designated "100:12", corresponding to a labeled switched path (LSP) of the MPLS network.

The foregoing XML file also identifies VRF neighbors associated with each VFR included in the database. In the foregoing example, the first identifier VFR "HP" is indicated to have a VFR neighbor represented as a remote provider edge router labeled "service provider_PE 2", corresponding to provider edge router 134 in the FIG. 1 example. Those skilled in the art will appreciate that multiple VFR neighbors can be associated with each VFR table. The foregoing XML file can include information similar to that described above with respect to each provider edge router, for each MPLS VPN.

Creation of the above exemplary XML file designated VPN_INFO can begin by building a seed file, based on all routers identified in the network database that are MPLS VPN enabled. Subsequent steps in the creation of the VPN_INFO file are based on this seed file. Exemplary pseudocode for creation of the foregoing VPN_INFO file is as follows:

Seed: use filter to get list of ALL routers in network node database that are MPLS VPN enabled:
 For each router, get the IP address to be used for SNMP Queries
For each router that is MPLS VPN enabled:
 Perform SNMP Queries to obtain:
  VRF Details from the VRF Table included in router MIB
  Interface to VRF Relationships from IF-Conf table Route Target Import/Export lists
For each Interface that has a VRF:
 Query node management database to obtain Interface (IF) information: (IFIndex; IFDescr; Object-id)
 VPN Objects can be created using the VRF information, such as, the Route Targets, to link various VRFs together. Upon creating the foregoing exemplary VPN_INFO file, the VPNs of the network can be identified using the following pseudocode:
For each VRF object, examine list of Import and list of Export Route Targets.
Two VRFs are considered part of the same VPN ONLY IF one of the VRFs has an Export Target matching that of the second one's Import Target.
If VRF1 and VRF2 are identified as "neighbors" (using Import/Exports) AND VRF2 and VRF3 are identified as neighbors, all three are considered to belong to the same VPN Each identical VPN can be provided a name. Every VPN has an internal ID (obj-id) and a VPN-name (user-visible). Exemplary guidelines for implementing VPN naming are as follows:

Using VPN internal ID and/or VPN name, try to pick a unique VRF name (at this point, uniqueness not guaranteed)

User can override name selection through a configuration file

A default naming algorithm can be invoked whereby multiple discoveries pick the same name (unless the set of VRF names changes).

An exemplary VPN naming process is as follows:
1. If a user-configured file has any of the VRFs in this VPN, use that name; ELSE:
2. Use the Default naming method as follows:
   a. If ALL the VRFs within the VPN have the same name, use that name;
   b. ELSE, pick a VRF name within this VPN. E.G.: Pick lexically (alphabetically) smallest VRF Name that does NOT match with that of any VRF in other VPNs (i.e., multiple discoveries are considered to pick the same name, unless the set of VRF names changes).

An alternate process for Default naming of VPN's can be implemented as follows:
   a. If ALL the VFR's within the VPN have the same name, use that name:
   b. ELSE, automatically do string matches (e.g., one VFR has the name "HP FC" and another has the name "HP PA", call the VPN "HP").

Those skilled in the art will appreciate that any mechanism for naming the VPN including those processes noted above, can be implemented in any order desired by the user. In the foregoing example, HP FC and HP PA can correspond to two different customer sites, such as an HP site located at Ft. Collins and an HP site located at Palo Alto. Using the information acquired in the discovery process described above, the exemplary system described herein can determine that multiple sites are on the same VPN such that a common name can be used to describe the nodes associated with these sites. The string matching operation mentioned above, can for example, be used to identify the common name "HP" among the multiple VFR tables.

An example of a user-configured file format for naming a VPN is as follows:

| Configuration File Format With Example | | |
|---|---|---|
| VRF Name | VPN Name | PE |
| PURPLE_EAST | PURPLE | |
| ORANGE | LIGHT_ORANGE | PE_1 |
| ORANGE | DARK_ORANGE | PE_2 |

Figure 2:
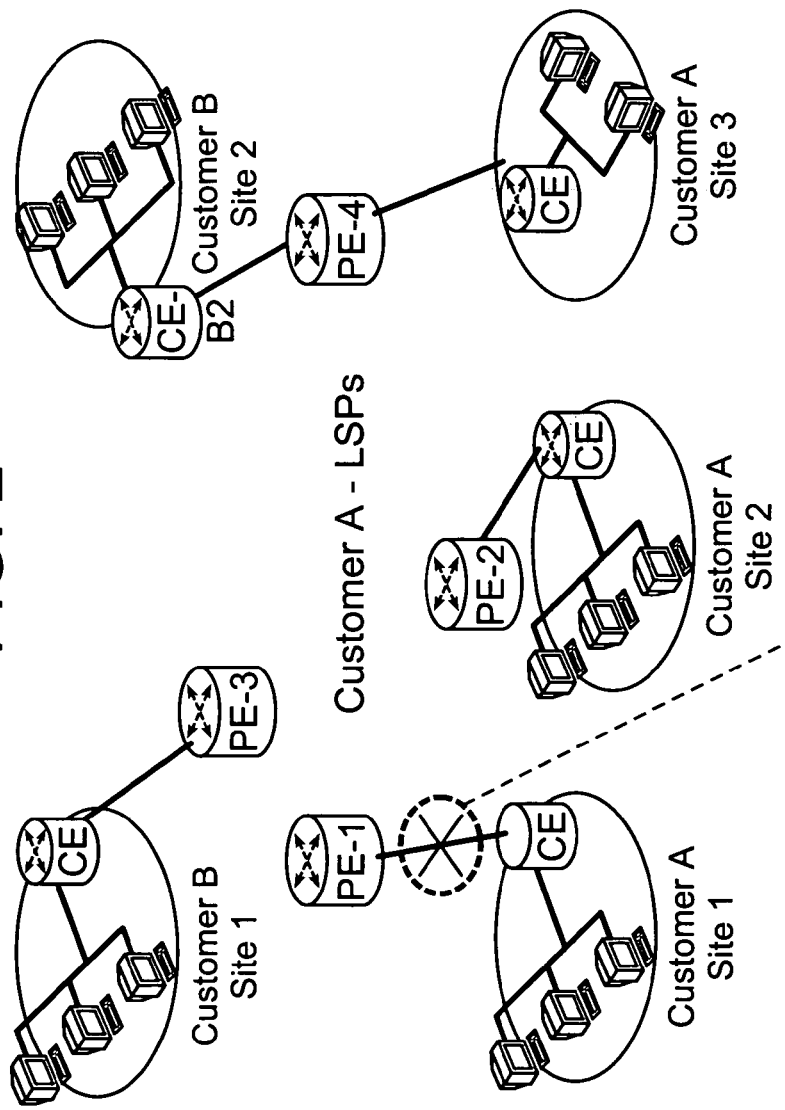
FIG. 2 illustrates an exemplary discovery process for detecting a fault in a network communication link.

FIG. 2 shows an exemplary benefit of using the FIG. 1 system, where a provider edge (PE) router-customer edge (CE) router interface/link has failed. In this example, the failed link between the Customer A edge router 114 for the site 108 and the service provider edge router 132 can be identified as impacting customer A's VPN. In accordance with exemplary embodiments described herein, events associated with this interface/link failure are thus correlated with the affected VPN to provide useful information to the network administrator regarding the failure.

For example, as shown in the table of FIG. 2, the occurrence of an interface failure associated with this link can be displayed to the user. This can be provided to the network administrator with information identifying the source (interface 1 of provider edge router 1 (i.e., provider edge router 132)), and information identifying the impacted VPN (i.e., the VPN of Customer A).

Figure 3:
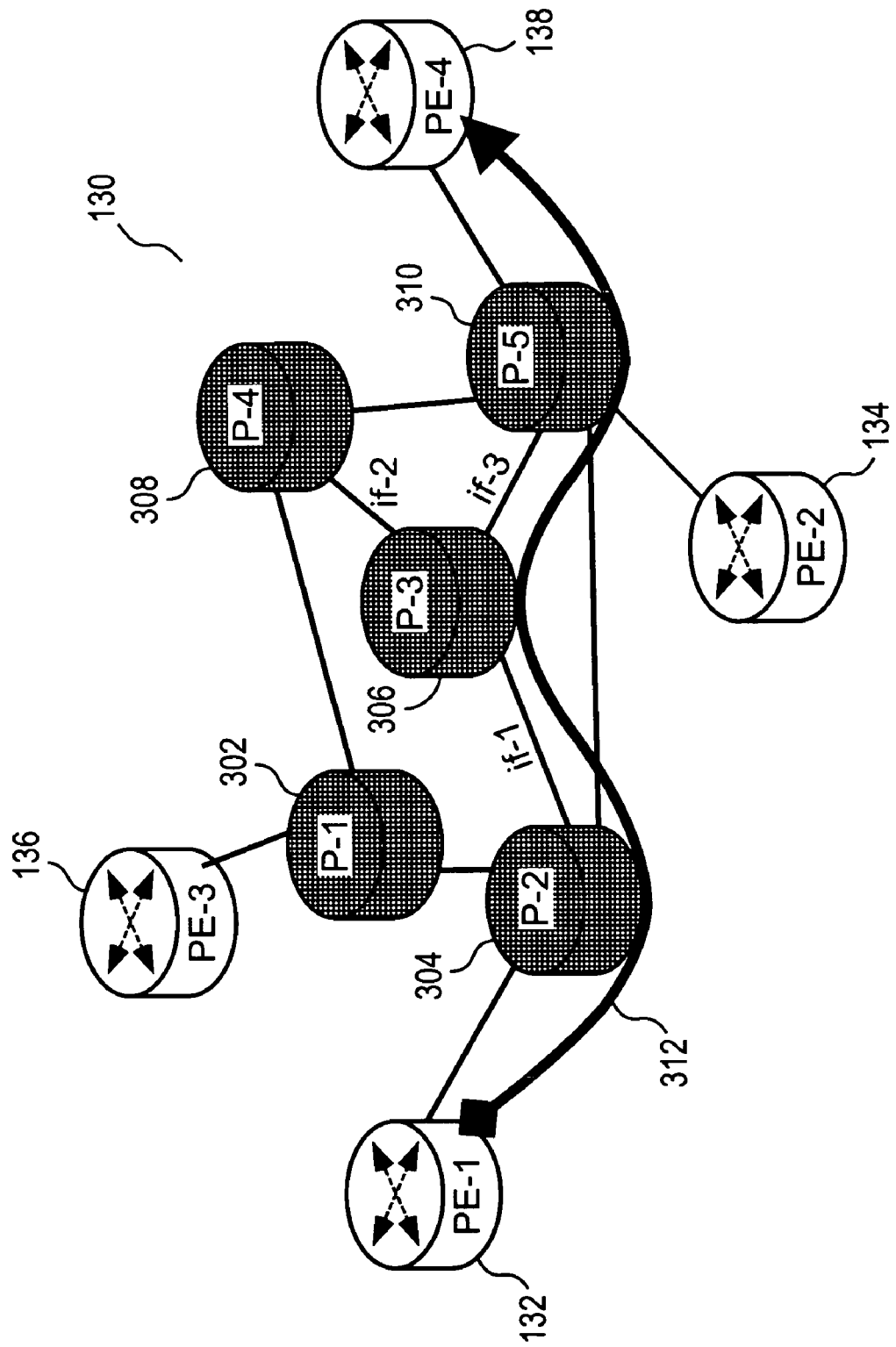
FIG. 3 shows an exemplary Label Switch Path (LSP) overlaid on an MPLS VPN network.

FIG. 3 shows an exemplary MPLS view of a labeled switched path (LSP) overlay on the MPLS core of the FIG. 1 service provider network 130. FIG. 3 illustrates the service provider network 130 includes the edge routers 132-138, along with interior routers designated 302, 304, 306, 308 and 310. The interior provider router 306, labeled "P-3", is shown to include three interfaces labeled IF-1, IF-2 and IF-3. A labeled switched path 312 between the provider edge router 132 and the provider edge router 138 is shown to pass through the interior provider routers 304, 306 and 310 (labeled P-2, P-3 and P-5, respectively). Using this path, packets can pass between sites 1 and 3 for Customer A in FIG. 1.

Figure 4:
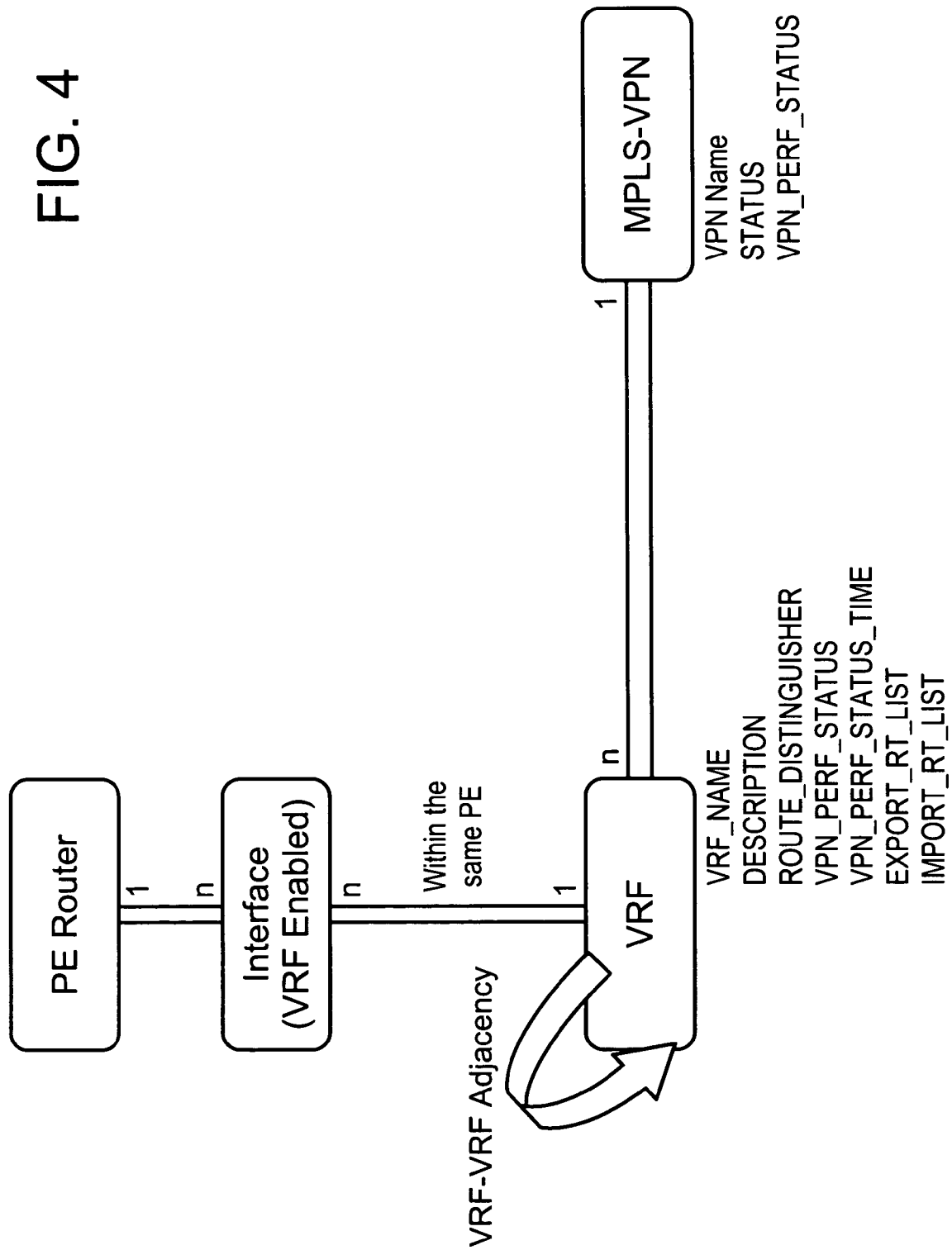
FIG. 4 shows a conceptual object model of network components used in accordance with an exemplary embodiment described herein.

FIG. 4 shows an exemplary conceptual object model associated with the discovery and naming of VPNs in accordance with an exemplary embodiment of the present invention. As shown in FIG. 4, any of "n" primary edge routers can include any number of VRF enabled interfaces (e.g., "n" interfaces). For each interface, VRF-VRF adjacency can be determined using the VRF tables.

VRF-VRF adjacency refers to those routers having VRF tables with information that indicates the routers communicate directly or indirectly with one another. For example, where a VRF table of a first router indicates that the router exports to a particular routing target, and the VRF table of a record router indicates that the second router imports data from the same routing target, adjacency is considered to exist.

For each VRF, the following information can be included in the table:

VRF_NAME
DESCRIPTION
ROUTE_DISTINGUISHER
VPN_PERF_STATUS
VPN_PERF_STATUS_TIME
EXPORT_RT_LIST
IMPORT_RT_LIST.

As already discussed, each VRF table is associated with an MPLS-VPN. Each MPLS-VPN can be identified by:

VPN NAME
STATUS
VPN_PERF_STATUS.

In the foregoing information, a VRF name is described by its association with the MPLS-VPN network. A route distinguisher is provided to indicate routes with which it is associated. Performance status and performance status time information can be included along with import and export router lists.

Although the present invention has been described in connection with embodiments thereof, it will be appreciated by those skilled in the art that additions, deletions, modifications, and substitutions not specifically described may be made without departing from the spirit and scope of the invention as defined in the appended claims.

The invention claimed is:

1. Method for managing network nodes which communicate via connectivity services of a service provider, comprising:

retrieving, by a management system, information from a virtual private network routing and forwarding (VRF) table of a router;

discovering, based at least in part on the retrieved VRF information, status and configuration information for each set of nodes grouped by the service provider, and status information of one or more router interfaces between the service provider and the nodes; and assigning a name to each set of nodes.

2. Method according to claim 1, wherein the network is a multiprotocol label switching (MPLS) virtual private network (VPN), and wherein each set of nodes is a VPN configured by the service provider.

3. Method according to claim 1, comprising:
storing the status and configuration information in a memory.

4. Method according to claim 3, wherein the status and configuration information is stored in an extensible markup language (XML) file.

5. Method according to claim 2, wherein the status and configuration information includes a status for each VPN configured in the network.

6. Method according to claim 2, wherein the status and configuration information indicates where each VPN is deployed.

7. Method according to claim 2, wherein the status and configuration information indicates which edge routers of the network are involved with which VPN.

8. Method according to claim 1, wherein the discovering is performed using information retrieved from the router by the management system which associates a router interface with the VRF table.

9. System for managing network nodes which communicate via connectivity services of a service provider, comprising:
a processor for:
retrieving information from a virtual private network routing and forwarding (VRF) table of a router; and
discovering, based at least in part on the retrieved VRF information, status and configuration information for each set of nodes grouped by the service provider, and status information of one or more router interfaces between the service provider and the nodes; and for assigning a name to each set of nodes; and
a memory for storing the status and configuration information for use by the processor.

10. System according to claim 9, wherein the network is an multiprotocol label switching (MPLS) virtual private network (VPN), and wherein each set of nodes is a VPN configured by the service provider.

11. System according to claim 9, wherein the processor stores the status and configuration information in a memory.

12. System according to claim 10, wherein the status and configuration information is stored in an extensible markup language (XML) file.

13. System according to claim 10, wherein the status and configuration information includes a status for each VPN configured in the network.

14. System according to claim 10, wherein the status and configuration information indicates where each VPN is deployed.

15. System according to claim 10, wherein the status and configuration information indicates which edge routers of the network are involved with which VPN.

16. System according to claim 9, wherein the processor retrieves from the router and uses in the discovering information which associates a router interface with the VRF.

17. A computer readable medium for storing a computer program which configures a computer processor to:
retrieve information from a virtual private network routing and forwarding (VRF) table of a router;
discover, based at least in part on the retrieved information, status and configuration information for each set of nodes grouped by the service provider, and status information of one or more router interfaces between the service provider and the nodes; and
assign a name to each set of nodes.

18. A computer readable medium according to claim 17, wherein the network is an multiprotocol label switching (MPLS) virtual private network (VPN), and wherein each set of nodes is a VPN configured by the service provider.

19. A computer readable medium according to claim 17, comprising:
storing the status and configuration information in a memory.

20. A computer readable medium according to claim 19, wherein the status and configuration information is stored in an extensible markup language (XML) file.

21. A computer readable medium according to claim 18, wherein the status and configuration information includes a status for each VPN configured in the network.

22. A computer readable medium according to claim 18, wherein the status and configuration information indicates where each VPN is deployed.

23. A computer readable medium according to claim 18, wherein the status and configuration information indicates which edge routers of the network are involved with which VPN.

24. A computer readable medium according to claim 17, wherein the discovering is performed using information retrieved from the router which associates a router interface with the VRF table.

25. Apparatus for managing network nodes which communicate via connectivity services of a service provider, comprising;
means for retrieving information from a router virtual private network routing and forwarding (VRF) table;
means for discovering, based at least in part on the retrieved VRF information, status and configuration information for each set of nodes grouped by the service provider and status information of one or more router interfaces between the service provider and the nodes, and for assigning a name to each set of nodes; and
means for storing the status and configuration information for use by the discovering and assigning means.

* * * * *